No. 848,057. PATENTED MAR. 26, 1907.
H. SECKENDORFF.
BREAD CUTTER AND BOX.
APPLICATION FILED DEC. 15, 1906.
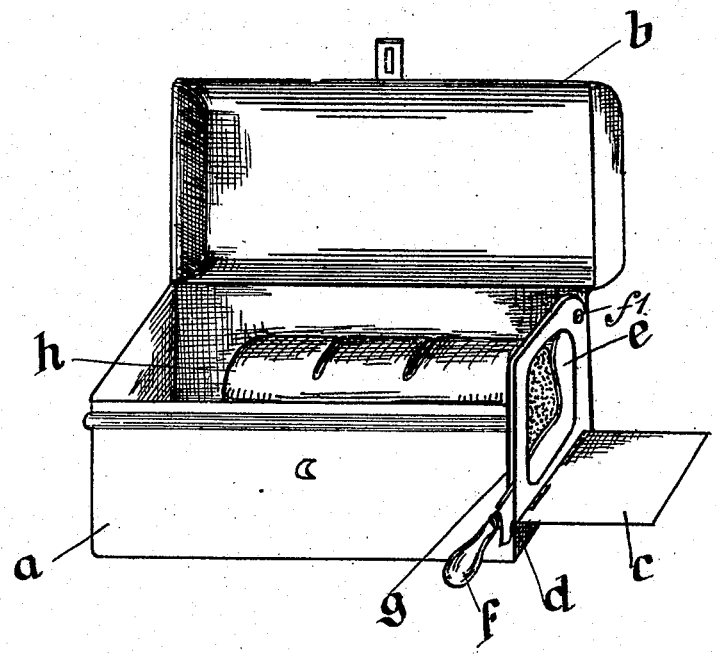
Witnesses
A J Madden
S Ford
Inventor
Hermann Seckendorff
by his Attorney R Madden
THE NORRIS PETERS CO., WASHINGTON, D. C.

UNITED STATES PATENT OFFICE.

HERMANN SECKENDORFF, OF HANOVER, GERMANY.

BREAD CUTTER AND BOX.

No. 848,057.      Specification of Letters Patent.      Patented March 26, 1907.

Application filed December 15, 1906. Serial No. 347,999.

*To all whom it may concern:*

Be it known that I, HERMANN SECKENDORFF, a subject of the Emperor of Germany, residing at Hanover, Germany, have invented certain new and useful Improvements in Bread Cutters and Boxes, of which the following is a specification.

This invention relates to an improved bread cutter and box so constructed that the opening of the box-lid automatically releases a shutter which normally covers the knife.

The invention is illustrated in the annexed drawing, which is an elevation of the cutter and box, the latter being open and containing a loaf of bread.

The wall $d$ of the box $a$ is provided with a hinged part $c$, adapted to be engaged by the lid $b$ of the box when the latter is closed. When the lid is raised, the part $c$ is released and rotates on its hinges into the horizontal position in which it is shown in the drawing, thus exposing the knife $e$ and a lateral aperture for the passage of the bread. The knife is provided with a handle $f$ and is pivoted at $f'$ to the guide $g$. Suitable ledges or the like may be provided in the box in order to support the bread at the proper level.

For cutting the bread the knife $e$ is raised and one end of the loaf $h$ is pushed into the aperture of the guide $g$, whereupon the knife is lowered again. The slice cut by this means falls onto the horizontal plate $c$. The loaf itself, or such portion thereof as has not already been cut into slices, need not be removed from the box for the purpose of cutting the bread. The knife is entirely inclosed when not in use, so that there is no risk of injury in handling the box. The apparatus is very compact and convenient.

What I claim as my invention, and desire to secure by Letters Patent of the United States, is—

1. The combination of a box having a lid and an aperture in one of its walls, a hinged member adapted to cover said aperture, said member being adapted to be held in such covering position when said lid is closed, and released when the lid is opened, and a knife pivoted adjacent said aperture substantially as described.

2. The combination of a box having a lid and an aperture in one of its walls, a hinged member adapted to cover said aperture, said member being adapted to be held in such covering position when said lid is closed, and released when the lid is opened, a knife pivoted adjacent said aperture, and a guide for said knife substantially as described.

3. The combination of a box having a lid and an aperture in one of its walls, a hinged member adapted to cover said aperture, said member being adapted to be held in such covering position when said lid is closed, and released when the lid is opened, an apertured guide adjacent the wall aforesaid and a knife pivoted between said guide and wall substantially as described.

In witness whereof I have signed this specification in the presence of two witnesses.

HERMANN SECKENDORFF.

Witnesses:
    HENRY J. FULLER,
    PAUL R. THOMPSON.